Aug. 16, 1927.
W. T. HENSLEY
PULLEY
Filed April 6, 1922
1,639,498
2 Sheets-Sheet 1
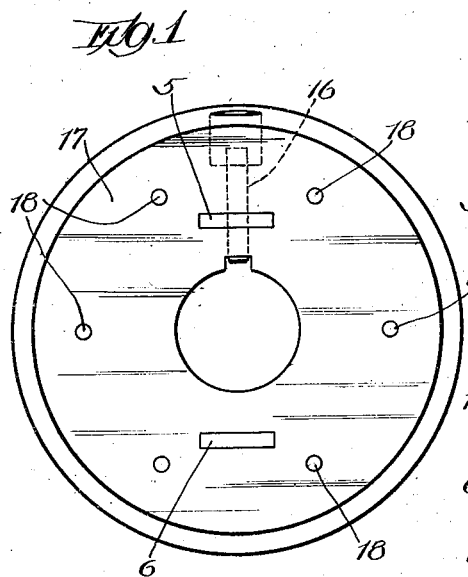
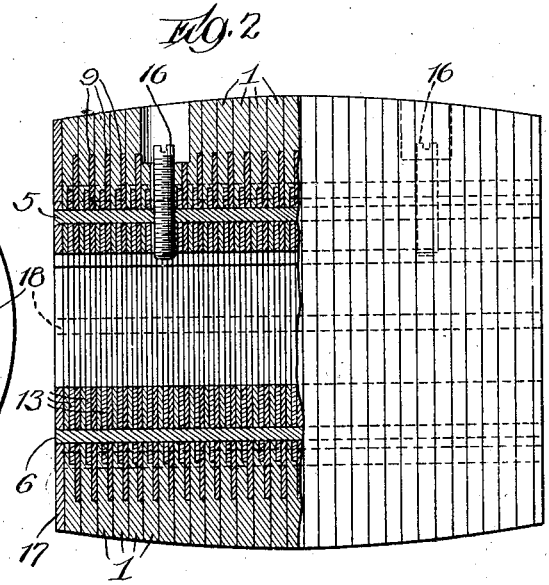
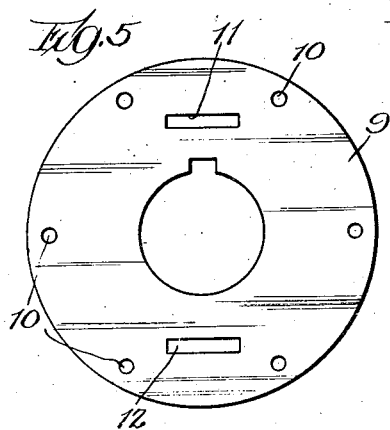
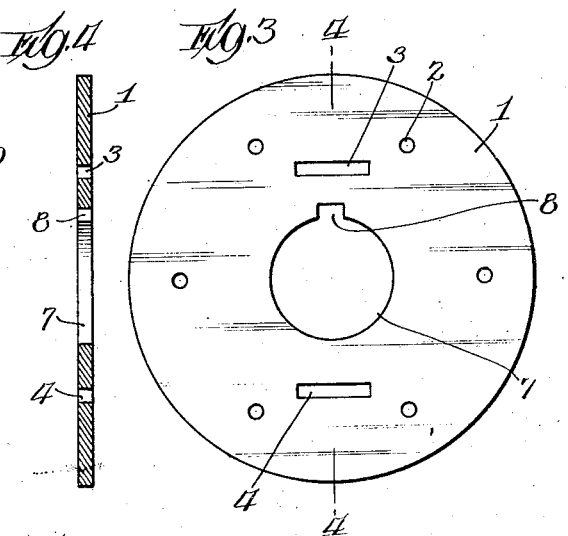
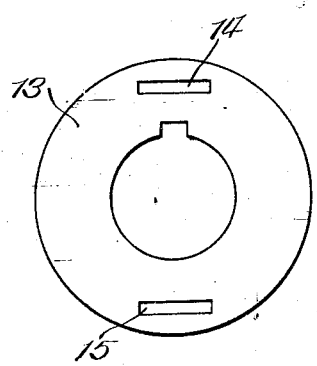
Inventor
William T. Hensley
by Arthur H. Durand
Atty.

Aug. 16, 1927.
W. T. HENSLEY
1,639,498
PULLEY
Filed April 6, 1922    2 Sheets-Sheet 2
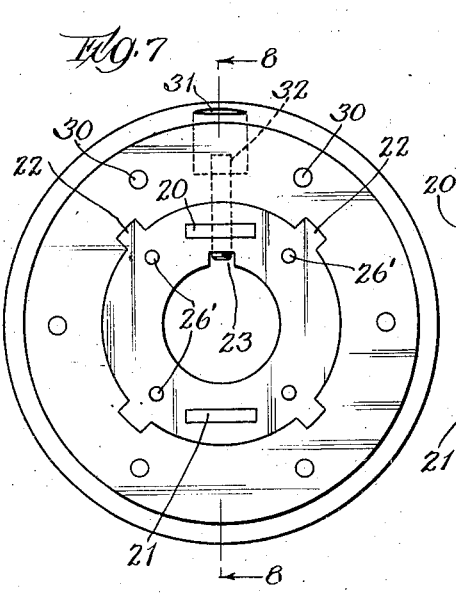
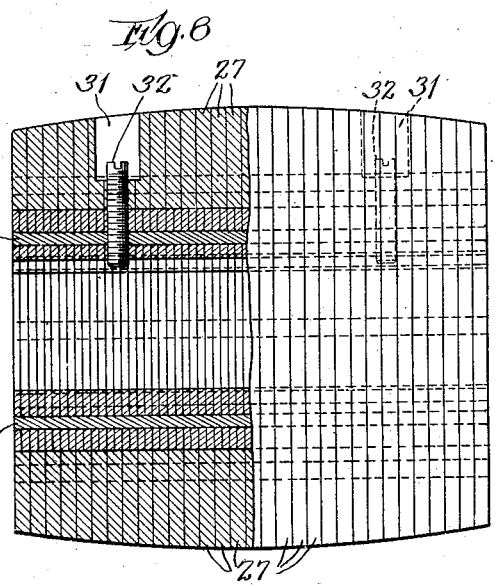
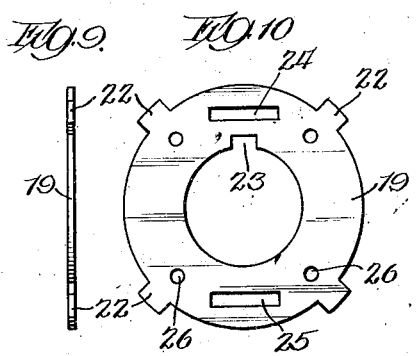
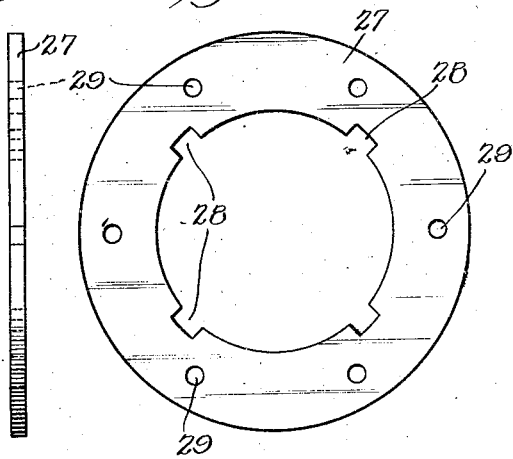
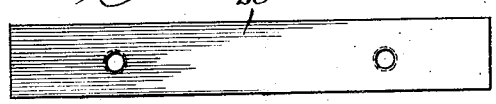
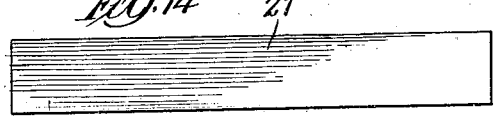
Inventor:
William T. Hensley
by Arthur F. Durand
Atty.

Patented Aug. 16, 1927.

1,639,498

UNITED STATES PATENT OFFICE.

WILLIAM T. HENSLEY, OF MARION COUNTY, INDIANA.

PULLEY.

Application filed April 6, 1922. Serial No. 550,001.

This invention relates to pulleys of that kind in which the body of the pulley is formed by layers of fibrous material extending at right angles to the axis of the pulley and having their outer edges adapted to form the frictional outer surface of the pulley.

It is an object of the invention to provide a balanced, symmetrical, laminated pulley, preferably of the paper type, in which the laminated material is more dense at the inner portion than upon the outer surface, thus providing a relatively soft and maximum frictional surface for engagement with a belt, and a relatively dense inner portion having a maximum mechanical strength for engagement with a shaft.

A further object of the invention is to provide a laminated pulley, primarily for power transmission, having a plurality of reinforcing layers of relatively harder material between which the fibrous laminæ may be compressed, thus providing a relatively dense inner portion without the use of a tubular metallic core or hub, such as is commonly used with paper pulleys.

It is also an object to provide certain details and features of construction tending to increase the general efficiency and the desirability of a laminated pulley of this particular character.

To these and other useful ends the invention consists in matters hereinafter set forth and claimed and shown in the accompanying drawings in which—

Figure 1 is an end view of a pulley embodying the principles of the invention.

Figure 2 is a side elevation of said pulley, showing substantially one-half thereof in longitudinal section.

Figure 3 is a face view or side elevation of one of the larger plates or layers forming the laminated structure.

Figure 4 is a section on line 4—4 in Figure 3.

Figure 5 is a view similar to Figure 3, showing the next smaller size of plates employed in said laminated structure.

Figure 6 is a similar view showing the smallest size of said plates.

Figure 7 is a view similar to Figure 1 showing a different form of the invention.

Figure 8 is a vertical longitudinal section on line 8—8 in Figure 7.

Figure 9 is an edge view of one of the plates or discs or laminæ involved in the construction shown in Figures 7 and 8.

Figure 10 is a side elevation of the disc shown in Figure 9.

Figure 11 is an edge view of one of the larger rings or plates or laminæ shown in Figures 7 and 8.

Figure 12 is a face view or side elevation of the plate shown in Figure 11.

Figure 13 is a face view or plan of one of the strips or keys involved in the construction of the pulley.

Figure 14 is a similar view of the other strip or key.

As thus illustrated, the invention comprises a plurality of plates or discs 1 of fibrous material, such as straw board or paper or other similar fibrous material, these plates in the finished pulley being of different sizes or diameters, preferably, to give the pulley a slight taper toward each end thereof, so that it has a rounded or crowned surface, thereby to support the belt in the desired manner. These plates have openings 2 for dowels of any suitable character and they also have rectangular openings or slots 3 and 4 for the set screw bar 5 and the balancing bar 6, these bars being metal strips which extend parallel with the dowels. Also, as shown, the plates 1 are provided with center openings 7, each opening having a notch 8 for a key on the shaft. The plates 9 are smaller and are of uniform diameter or size and have holes 10 for the dowels and slots 11 and 12 for the previously mentioned bars 5 and 6 of the pulley. The plates 13 are still smaller, being within the circle of the holes 2 and 10, but having the slots 14 and 15 for the bars 5 and 6, as shown. The plates 9 and 13 are preferably of a hard and tough and fibrous material, such as fibre board, so that they are sufficiently hard and strong to directly engage the shaft upon which the pulley is mounted, thereby obviating the necessity of a metal hub or core for the pulley. An adhesive binder of any suitable character, such as casein glue, is employed between the plates, and the latter are forced together by pressure sufficient to condense the inner portions of the plates 1 in the manner shown. However, the outer edge portions of the plates 1 are left comparatively loose and soft and of a character to provide a proper exterior for engagement with the belt, for if the exterior is too hard and dense the belt will slip, but with the construction shown and described the interior is hard and dense and the exterior or peripheral portions of the pulley are softer and adapted to ensure the proper frictional engagement with the belt. Set screws 16 are inserted through the laminated structure thus formed, at one side of the pulley, and through the bar 5, to bear against the key on the shaft, so that the pulley is held against axial displacement. The rods or dowels 18 are inserted in the holes 2 and 10 of the end plates 17 and the bars 5 and 6 are inserted in apertures in the end plates, securing the end plates so that the laminated structure is firmly held between them. Preferably, the bars 5 and 6 are secured to the end plates by riveting, as indicated in Fig. 2 of the drawing, though they may be secured in any suitable manner. In this way a laminated pulley of fibrous material is provided, as stated, which is so constructed that the plates or layers or laminæ directly engage the shaft at their inner edges and directly engage the belt at their outer edges. The density of the laminated mass, as explained, increases from the exterior of the pulley toward the center thereof, so that the density and hardness of the center are so great that the laminated structure is adapted to directly engage the shaft and to withstand the torque thereof and to transmit power. In this way, therefore, a comparatively inexpensive pulley is made which ensures reliable and satisfactory results in use. It is obvious, of course, that the bars 5 and 6 may also be of fibre or any other suitable material, though it is preferable to have them of metal to more easily secure them to the metal end plates 17.

As shown in Figures 7 to 12 inclusive the construction is similar to that previously described, but with the following differences: In this case the core or hub of the pulley is composed of rings or discs or laminæ 19 made of metal or hard fibre or of any suitable or relatively hard substance, compressed together and held in such relation by the bars or strips 20 and 21, which latter are similar to the bars 5 and 6 previously described. These discs 19 are formed at their outer edges with lugs 22, and at their inner edges with notches 23 to receive the key on the shaft, as previously described. Also, these discs or laminæ 19 have slots 24 for the bar or strip 20 and slots 25 for the bar or strip 21, and in addition these discs 19 have holes 26 for the dowel pins 26' which are employed to hold them compressed tightly together, thereby to ensure a solid mass composed of laminæ disposed in parallel planes at right angles to the axis of the pulley, so that the laminæ directly engage the shaft and the spline or key thereon. With this construction, the body or outer portion of the pulley can be of any suitable or desired construction, but in its finished form is preferably composed of rings or discs or laminæ 27 of different diameters, so that the pulley is rounded and slightly larger at the center than at each end thereof. These discs or laminæ 27 are preferably formed of softer fibrous material, or material of any suitable character, so that an effective frictional driving surface will be provided to engage the belt. Said discs or laminæ 27 have their inner edges provided with notches 28 to engage the lugs 22 previously mentioned, and have holes 29 for the dowel pins or rods 30 which are employed to tightly bind the discs 27 together, but with less density than what results from the compression of the laminæ 19 together in the manner described. Some of the discs or laminæ 27 are notched at 31 to receive the screws 32 which are threaded in the strip 20 and which engage the spline or key on the shaft, thus holding the pulley against endwise or axial displacement. The core or hub formed from the discs or laminæ 19 is forced into the body composed of the discs or laminæ 27, under pressure, so that the core and external body become practically one solid and coherent mass, the various discs or laminæ being glued or cemented or otherwise treated with adhesives to make them adhere to each other. In other words, an adhesive binder of any suitable character can be used upon the surface of the laminæ, or otherwise, to assist in forming them into a solid mass by compression exerted in any suitable or desired manner, it being obvious that different methods can be employed for the assembling of the pulleys thus constructed.

From the foregoing it will be seen that, with either form of the invention, the pulley involves tightly compressed laminæ which directly engage the shaft, and which at this point of engagement will be hard enough to withstand the torque when the pulley is driven by the belt, or when the belt is driven by the pulley, as the case may be. In either case, as explained, no integral, tubular hub is necessary for the pulley, inasmuch as the laminated structure is of such character that the inner edges of the laminæ are adapted to directly engage the shaft and the spline or key thereof, in a manner to ensure the desired results.

It will be understood that in Figures 7 and 8 the extreme end plates or discs can be of metal or other hard material to hold the intermediate discs or laminæ in place. Or, if desired, end plates of sufficient diameter to cover the ends of the pulley, such as the metallic end plates 17 shown in Figures 1 and 2, can be employed in this construction. It is obvious, of course, that the plates 9 and 13 may be of metal or of any other suitable or desired material. It is also obvious that either construction, as shown and described, obviates the necessity of a separate hub or core for the pulley, such as an integral metal cylinder, or a cylindric hub of any character. The laminæ may be pressed together by means of a suitable press and then held by any suitable means while the assembly is being dried. After drying, the laminæ are permanently shrunk or set and have very little, if any, tendency to expand. In fact, when such an assembly of fibrous laminæ is dried, it is usually necessary to take out the shrinkage that has occurred and bring the end plates toward each other. This, however, depends of course on several variable factors, such as the amount of adhesive material used, the amount of moisture contained in the adhesive material, the amount of compression applied to the assembly, the amount of drying, etc. If fibrous material, such as strawboard, is utilized, the assembly can easily be pressed sufficiently to give it a permanent set in the press. Moreover, it is obvious that the strawboard or other fibrous plates or laminæ can be harder or more dense at the center of the pulley, where the diameter of the pulley is greatest, in order that the crown or curvature of the pulley may be maintained by wear on the surface thereof. In other words, with this difference in density or hardness the laminæ at and near the ends of the pulley will wear down more easily than those at the center or middle of the pulley. This can be done in various ways, of course, by using materials of different degrees of hardness and density, or by different degrees of compression, as is obvious. Thus, in the use of fibrous material, the density thereof can be greater where the laminæ engage the shaft, as and for the purposes previously described, and the density and hardness can also be greater on the surface at the middle portion of the pulley, where it is of greatest diameter, so that the crown or curvature will stand up and will not become worn or flattened by the pressure and friction of the belt. Furthermore, it will be seen that the holes 31 previously mentioned, shown in Figures 7 and 8, and the similar holes shown for the screws 16 in Figures 1 and 2, can be drilled after the pulley is fully formed, if this method is necessary and desirable. Of course, if for any reason, and if circumstances require, either all or some of the plates or laminæ can be made of metal to ensure positive and nonyielding engagement with the shaft and the spline or key thereon, and the invention is not limited to the use of any particular materials for the plates or laminæ, either wholly or in part. The invention, however, does afford opportunity for the advantageous and satisfactory use of strawboard or other fibre or fibrous material in the construction of the pulley, in the manner shown and described.

What I claim as my invention is—

1. A laminated power transmitting pulley in which the laminæ are compressed together and reduced materially more in bulk in the zone of the hub of the pulley than elsewhere in the pulley body in a manner to form a permanently set body having a cohesive comparatively hard and dense interior for direct driving engagement with the shaft or other support, and having a relatively softer exterior formed by the exposed outer edges of the laminæ or frictional driving engagement with the belt.

2. A structure as specified in claim 1, said laminæ being formed by plates of different diameters of fibrous material extending at right angles to the axis of the pulley, with means extending parallel with said axis to bind the plates together, and means to secure the pulley in position on the shaft with all of said plates in engagement therewith.

3. A structure as specified in claim 1, said laminæ comprising larger plates of relatively soft fibrous material and smaller plates of harder and more dense material.

4. A structure as specified in claim 1, comprising dowels extending parallel with the axis of the pulley to hold the laminæ together.

5. A permanently set cohesive laminated power transmitting pulley body having outer edges of the laminæ adapted for driving engagement with a belt and having inner denser portions adapted for direct driving engagement with a shaft, whereby power is transmitted to the laminated body of the pulley through direct driving contact with the shaft.

6. A pulley structure comprising permanently set cohesive laminated body adapted for direct engagement of the laminæ with the shaft or other support, embedded rivet bars extending longitudinally through the pulley body, said bars being threaded to receive means for holding the pulley on a shaft.

7. A pulley structure comprising a laminated body adapted to be mounted on a power transmitting shaft, embedded bars extending longitudinally through the laminæ of the pulley body serving as tie members to hold the laminæ against outward displacement, and means engaging said tie members to clamp the pulley to the shaft, said bars being suitably threaded to receive said means for securing the pulley to the shaft.

8. A power transmitting pulley having a relatively hard permanently shrunk cohesive laminated interior formation embodying laminæ of different external diameters, and a relatively soft exterior portion formed solely by the laminæ of larger diameter.

9. A pulley having a relatively hard permanently shrunk cohesive interior formation for direct driving engagement with a shaft, and a relatively soft permanently shrunk cohesive exterior portion for engagement with a belt.

10. A structure as specified in claim 1, comprising end plates for the pulley, longitudinal members extending through the pulley to engage said end plates, serving as tie members to hold said plates together against outward displacement, and one or more set screws extending through at least one of said members to engage said shaft or other support.

11. In a pulley, a body, end plates for said body, a tie member positioned solely on one side of the central opening of the pulley and extending through an intermediate portion of the body of the pulley to engage said plates, said tie member being connected to the end plates to hold the plates against outward displacement, and one or more set screws extending through said member to engage a shaft or other support on which the pulley is mounted.

12. A structure as specified in claim 11, said pulley having a groove to receive a spline or key on said shaft, and said set screw or screws being in position to engage said spline or key.

13. A laminated pulley for power transmission in which the inner portions of certain of the laminæ are compressed to at least one-half of their peripheral thickness to materially increase their density and to permanently set them, whereby a comparatively hard, dense interior for securing to a shaft or other support is formed.

14. A laminated pulley for power transmission comprising fibrous laminæ of compressible material and a plurality of plates of relatively hard material of less radial dimension, the inner portions of the fibrous laminæ being compressed between said plates to at least one-half of their peripheral thickness to form a permanently set, relatively hard, dense interior for engagement with a shaft or other support, the outer portions of said fibrous laminæ forming a relatively soft exterior providing a frictional surface.

15. A laminated pulley for power transmission comprising fibrous laminæ of compressible material and a plurality of plates of relatively hard material of less radial dimension, said laminæ and plates being substantially concentrically arranged, the inner portions of the fibrous laminæ being compressed between said plates to form a relatively hard, dense interior for engagement with a shaft or other support.

16. A laminated power transmitting pulley comprising fibrous laminæ of compressible material and a plurality of plates of relatively hard material of less external radial dimension, said laminæ and plates being substantially concentrically arranged and uniformly distributed through the pulley body, said laminæ being compressed to a materially greater degree between said plates, and means for holding the laminæ together.

17. The invention specified in claim 16 in which rivets or dowels extend through perforations in the fibrous laminæ and through perforations or notches in said plates.

WILLIAM T. HENSLEY.